(12) United States Patent
Eskandari et al.

(10) Patent No.: US 10,686,821 B2
(45) Date of Patent: Jun. 16, 2020

(54) ANALYSIS OF MOBILE APPLICATIONS

(71) Applicant: SAP SE, Walldorf (DE)

(72) Inventors: Mojtaba Eskandari, Trento (IT);
Maqsood Ahmad, Trento (IT);
Anderson Santana De Oliveira,
Antibes (FR); Bruno Crispo, Trento
(IT)

(73) Assignee: SAP SE, Walldorf (DE)

( * ) Notice: Subject to any disclaimer, the term of this patent is extended or adjusted under 35 U.S.C. 154(b) by 253 days.

(21) Appl. No.: 15/823,570

(22) Filed: Nov. 28, 2017

(65) Prior Publication Data

US 2019/0166148 A1     May 30, 2019

(51) Int. Cl.
*H04L 29/06* (2006.01)
*G06F 8/74* (2018.01)
*H04L 29/08* (2006.01)

(52) U.S. Cl.
CPC .......... *H04L 63/1433* (2013.01); *G06F 8/74* (2013.01); *H04L 67/02* (2013.01); *H04L 67/10* (2013.01); *H04L 67/18* (2013.01)

(58) Field of Classification Search
CPC .................. H04L 63/1433; H03L 63/1408
USPC ......................................................... 726/25
See application file for complete search history.

(56) References Cited

U.S. PATENT DOCUMENTS

| | | | | |
|---|---|---|---|---|
| 9,197,487 | B2* | 11/2015 | James | H04L 61/1511 |
| 9,286,063 | B2* | 3/2016 | Kriegsman | G06F 8/77 |
| 9,530,016 | B1* | 12/2016 | Pomerantz | G06F 21/554 |
| 2015/0348042 | A1* | 12/2015 | Jivraj | G06Q 20/322 705/44 |

* cited by examiner

*Primary Examiner* — Longbit Chai
(74) *Attorney, Agent, or Firm* — Buckley, Maschoff & Talwalkar LLC

(57) ABSTRACT

Methods and system are disclosed that analyze a mobile app. In one aspect, an input including a URL address of the mobile app may be received. The URL address may correspond to the mobile app stored on a mobile application distribution platform. The mobile app may be downloaded from the URL address. Upon downloading the mobile app, a static analysis engine may be instantiated to perform static analysis of the mobile app. A dynamic analysis engine may be instantiated to perform a dynamic analysis of the mobile app. A location analysis engine may be instantiated to perform location analysis. Based on the results of the static analysis, dynamic analysis and location analysis, graphical visualizations may be generated. Based on the graphical visualizations, compliance or violation of data protection standards of the mobile app may be determined.

20 Claims, 15 Drawing Sheets

```
1  ...
2  INT I, SUM, COUNT;
3  I = 1;
4  SUM = 0;
5  FOR (; I != 50; I++){
6      SUM += I;
7      COUNT = COUNT * 100 / I;
8  }
9  SYSTEM.OUT.PRINTLN ("SUM =" + SUM); // POINT P
```

FIG. 3

| CLASS | METHOD | PARAMETER |
|---|---|---|
| JAVAX/NET/SSL/SSLSOCKETFACTORY | CREATESOCKET | HOST, PORT |
| ANDROID/NET/URI | PARSE | URI |
| JAVA/NET/URL | <INIT> | * |
| JAVA/NET/SOCKET | SETREQUESTPROPERTY | KEY, VALUE |
| ORG/APACHE/HTTP/CLIENT/METHODS/HTTPGET | <INIT>, SETURI | URI |
| ORG/APACHE/HTTP/CLIENT/METHODS/HTTPPOST | <INIT>, SETURI, SETENTITY | URI |
| ORG/APACHE/HTTP/CLIENT/METHODS/HTTPPUT | <INIT>, SETURI | URI |
| JAVA/IO/OUTPUTSTREAM | WRITE | * |
| JAVA/IO/WRITER | WRITE | * |

TABLE 1

FIG. 4

```
1  <BACKTRACKING - PATTERN
2   ACTIVE= "TRUE" CLASS= "ORG/APACHE/HTTP/CLIENT/METHODS
    /HTTPPOST"
3   DESCRIPTION = "APACHE HTTP POST" METHOD = "SETURL"
    PARAMETERS = "LJAVA/LANG/STRING;"
4   INTERESTING = "0" / >
```

FIG. 5

1  CONST-STRING V0, "FACEBOOK.COM"
2  SPUT-OBJECT P0, LCOM/FACEBOOK/SETTINGS;->FACEBOOKDOMAIN: LJAVA/LANG/STRING;
3  SPUT-OBJECT V0, LCOM/FACEBOOK/SETTINGS;->FACEBOOKDOMAIN: LJAVA/LANG/STRING;
4  SGET-OBJECT P0, LCOM/FACEBOOK/SETTINGS;->FACEBOOKDOMAIN: LJAVA/LANG/STRING;
5  CONST-STRING V0, "HTTPS://GRAPH.%S"
6  .....
7  MOVE-RESULT-OBJECT V4
8  INVOKE-DIRECT {V3, V4}, LJAVA/NET/URL;-><INIT>(LJAVA/LANG/STRING;)V

FIG. 6

| CLASS | METHOD | PARAMETER | PARAMETER EXAMPLE |
|---|---|---|---|
| ANDROID/CONTENT/CONTENTRESOLVER | QUERY | URI | CONTENT://MEDIA/EXTERNAL/VIDEO/MEDIA<br>CONTENT://SMS/INBOX<br>CONTENT://COM.ANDROID.BROWSER/HISTORY |
| ANDROID/NET/URI | PARSE | URI | |
| ANDROID/CONTENT/CONTEXT | GETSYSTEMSERVICE | NAME | LOCATION<br>CONNECTION<br>WIFI<br>NETSTATS<br>BATTERYMANAGER |
| ANDROID/TELEPHONY/<br>TELEPHONYMANAGER | GETALLCELLINFO<br>GETCELLLOCATION<br>GETDEVICEID<br>GETSIMCOUNTRYISO<br>... | * | |

TABLE 2

FIG. 7

| CATEGORY | INFORMATION |
|---|---|
| CONTENT | CALENDAR<br>CONTACTS<br>AUDIO<br>VIDEO<br>IMAGE<br>FILES<br>MMS & SMS<br>CALL LOG<br>SYSTEM SETTING<br>USER DICTIONARY |
| DEVICE | DEVICE ID<br>ONLINE ACCOUNTS<br>POWER STATE<br>SYSTEM ALARM<br>DEVICE LOCATION<br>TELEPHONY SERVICES |
| NETWORK | MAC ADDRESS<br>PROXY SETTINGS<br>NETWORK STATUS<br>NETWORK CONNECTIVITY<br>NETWORK USAGE<br>HISTORY AND STATISTICS |

802   804

TABLE 3

FIG. 8

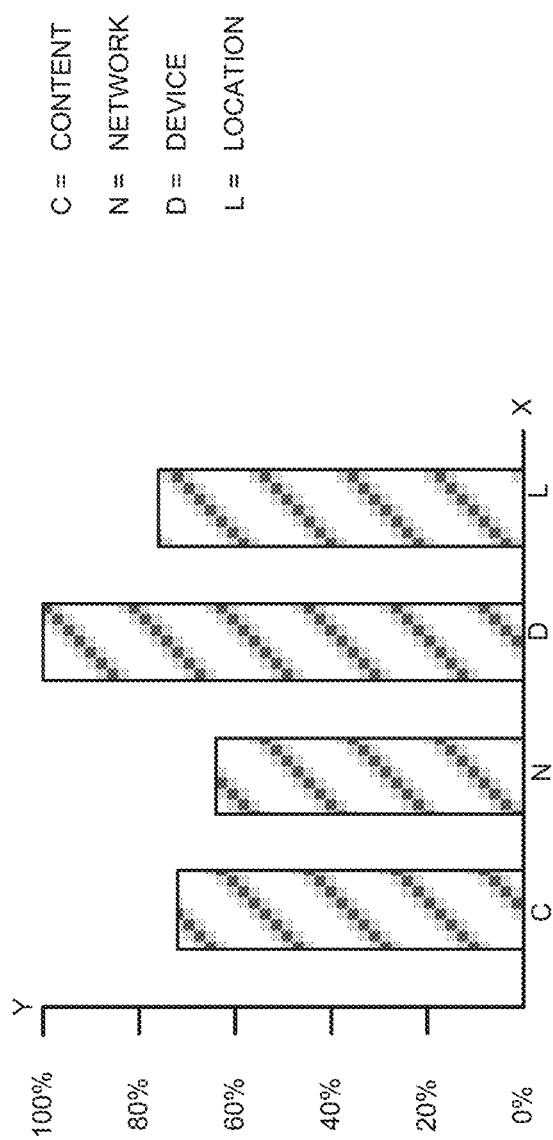

US 10,686,821 B2

ANALYSIS OF MOBILE APPLICATIONS

BACKGROUND

Typically, mobile apps (also referred to as mobile apps or apps) may transmit information or data to remote servers, based on location of data centers for processing and storage of the data. Such transmissions of information or data may however raise concerns related to privacy when the information or data is related to user's personal information. For example, transmission of such personal information or data may provide opportunities for hijacking the mobile phones and/or identity thefts. Further, such transmission of personal information to different geographical locations may also lead to violations of certain data protection laws or standards. Therefore, providing a mechanism to analyze mobile apps by determining dataflow paths and determining whether the mobile apps comply or violate jurisdiction based data protection standards, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 3 is an exemplary illustration of a code snippet of a backward program slice, according to an embodiment.

FIG. 4 is an exemplary illustration of a table including sink application programming interfaces, according to an embodiment.

FIG. 5 is an exemplary illustration of a code snippet that implements a backward slicer to execute a backward program slice, according to an embodiment.

FIG. 6 is an exemplary illustration of a code snippet for execution of backtracking, according to an embodiment.

FIG. 7 is an exemplarily illustration of a table including sources of personal data or personal information, according to an embodiment.

FIG. 8 an exemplarily illustration of a table including personal information or personal data, according to an embodiment.

FIG. 9 is an exemplary graphical illustration of the apps that access personal information or personal data, according to an embodiment.

DETAILED DESCRIPTION

Figure 1:
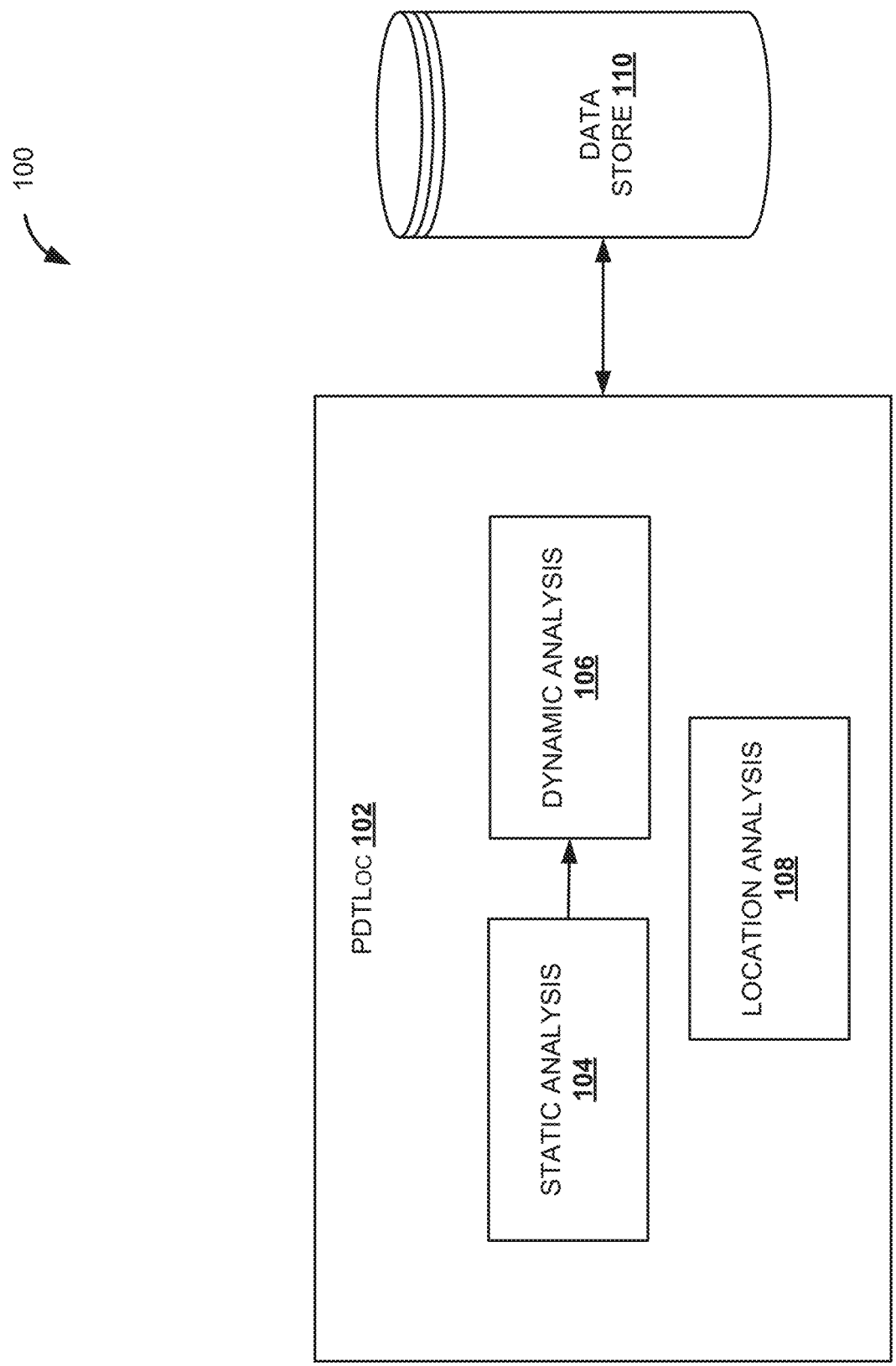
FIG. 1 is a block diagram illustrating a system at a high level to analyze a mobile apps, according to an embodiment.

Embodiments of techniques related to analysis of mobile applications are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a feature, structure, or characteristic described in connection with the embodiment is included in at least one of the one or more embodiments. Thus, the appearances of these phrases in various places throughout this specification are not necessarily all referring to the same embodiment. Furthermore, the features, structures, or characteristics may be combined in any suitable manner in one or more embodiments.

The number of smartphone (e.g., mobile phone, portable electronic device, portable multipurpose personal computer, cell phone, etc.) users has surged exponentially in the last decade. Further, technological advancements have enhanced data processing and storage capabilities of the smartphones. For example, the smartphones may include operating systems (e.g., Android®, Windows®, iOS®, etc.). The operating systems may provide access to mobile application distribution platforms (e.g., Google Play®, Windows Apps®, App Store®, etc.). The smartphones may connect with the mobile application distribution platforms via networks (e.g., the Internet) and download the apps. The apps may be bundled software applications that may execute to provide specific operations or functionalities. The smartphones may store different types or categories of personal data or personal information, such as contacts, financial information, calendar information, smart phone device identifiers, location, multimedia content, etc. In certain instances, personal data or personal information may correspond to data, information or content that may distinctly or uniquely identify a person or an entity. When triggered or instantiated, the apps may execute on the mobile device to provide an interface (e.g., graphical user interface (GUI)) for receiving user inputs, execute functionalities or process user requests and provide information or results that may be consumed by the end user. Some apps may request access to personal information or personal data that may include device identifier, location, personal data or personal information, and other content on the mobile device. Such apps may collect, process and transfer personal data to back-end servers or repositories (e.g., on premise or cloud computing environment) for further processing and storage.

The data or information that may be transferred from the smartphones to the servers or repositories that may be deployed in cloud computing environment and may be geographically distributed. For example, an app developed in the US may connect and transfer data to repositories deployed in China or Japan. When a user in the European Union downloads such an app on a mobile phone, the app may request access to the personal data stored on the mobile phone. The user may grant access to the personal data, but may not be aware that the app may transfer such personal data to repositories deployed in China or Japan. In an embodiment, certain types of data transfers across different geographies may raise concerns, when the data (e.g., personal data) is processed or stored in different jurisdictions (e.g., geographical location, physical locations, etc.). For example, data protection regulations or data protection standards such as Article 25.1 of the European Union General Data Protection Regulation (EU GDPR art. 44) may restrict transfer of personal data to certain geographical locations or jurisdictions. When enforced, EU GDPR art 44 may restrict or prohibit transfer of personal data to any country that does not enforce a standard for data protection (e.g., jurisdiction based data protection regulations or jurisdiction based data protection standards). Such enforcements for compliance of data protection may provide robust mechanisms for monitoring and preventing or tracking violations, thereby providing jurisdictional based protection of user's personal data. The enforcement of data protection standards may further provide an insight on the violations or compliance of jurisdiction based the data protection standards.

In an embodiment, the terms software components or components, software routines or routines, software models or models, software engines or engines, software scripts or scripts, layers etc., are employed interchangeably throughout the subject specification, unless context warrants particular distinction(s) among the terms depending on implementation. The implementation primarily involves executing a computer readable code such as, a sequence of instructions by a processor of a computing device (e.g., a special purpose computer, a general-purpose computer, mobile device, etc.) in an integrated environment. The computing device (e.g., personal data transfer location analyzer (PDTLoc)) may function as a special purpose computer when the memory in the computing device stores instructions which when executed by the processor, provide execution of specific operations or functionalities (e.g., instantiating static analysis engine, instantiating dynamic analysis engine, instantiating location analysis engine, generating visualizations, downloading mobile apps, determining dataflow paths, etc.). In some instances, the memory may store instructions that may not be limited to the aforementioned specific operations or functionalities. Unless the context warrants particular distinction(s), the cooperative execution of the above described operations or functionalities may improve the functioning of the special purpose computer. Further the special purpose computer may be adapted to perform operations or functionalities (e.g., as described above) that were not performed previously. Further, the execution of the aforementioned specific operations or functionalities may also overcome the drawbacks or challenges. Furthermore, the adaptation of the computing device to function as the special purpose computer may include executing the instructions to implement a mechanism to analyze (e.g., static analysis, dynamic analysis, location analysis, etc.) the apps. Based on the results of analysis, graphical visualizations may be generated and it may further be determined whether the mobile app complies or violates data protection standards.

FIG. 1 is a block diagram illustrating system 100 at a high level to analyze mobile apps, according to an embodiment. A mechanism to analyze an app may be implemented by system 100 as shown in FIG. 1. In an embodiment, the app may be analyzed by a personal data transfer location analyzer (PDTLoc 102) that may enable cooperative working of a static analysis engine, a dynamic analysis engine, a location analysis engine with data store 110. The static analysis engine may perform static analysis 104, the dynamic analysis engine may perform dynamic analysis 106 and the location analysis engine may perform location analysis 108 (also referred to as location investigation analysis). The results of the analysis (e.g., static analysis 104, dynamic analysis 106, location analysis 108, etc.) may be stored in data store 110. In an embodiment, data store 110 may correspond to a data structure, e.g., web-based database, relational database, in-memory database, etc. The intermediate results of the analysis (e.g., static analysis 104, dynamic analysis 106, location analysis 108, etc.) may be accessed by PDTLoc 102. The results of the static analysis 104, dynamic analysis 106 and location analysis 108 may be used to determine whether the analyzed apps comply or violate with data protection standards. For example, when the apps transfer some types of data (e.g., personal data) to remote servers that are located in different geographical locations or different jurisdictions, they may violate the data protection standards. The results of static analysis 104 and dynamic analysis 106 may be consumed independently or in combination, to determine the compliance or the violation of the data protection standards. In an embodiment, the compliance or the violation of the data protection standards may be determined through visualizations (e.g., graphical illustrations) generated by PDTLoc 102 that may be based on the results of static analysis 104, dynamic analysis 106 and location analysis 108.

In an embodiment, PDTLoc 102 may analyze the apps and provide information on type of personal data or personal information that was accessed by the apps, the jurisdictions of remote servers (e.g., geographical locations) to which the different types (e.g., network, device, calendar, etc.) the personal data or the personal information was transferred, etc. Based on such information, it may be determined whether the app complies or violates data protection standards (e.g., EU GDPR art 44), enterprise defined data protection standards (e.g., corporate data protection standards). In an embodiment, PDTLoc 102 may provide a platform or framework for analyzing dataflow, for example, the flow of data from source point to sink point, when the app access and transfers personal data or personal information from the mobile device to the remote servers. Analyzing the transfer of personal data or personal information may include analyzing dataflow between mobile operating system and the remote servers. For example, the mobile operating system may call or execute function calls to application programming interfaces for executing specific operations (e.g., accessing, transferring, etc.). In an embodiment, the information provided by PDTLoc 102 may also be used to determine a compliance or a violation of terms of service (e.g., user defined, entity defined, mobile application distribution platform defined, etc.) and privacy policy associated with the apps.

Figure 2:
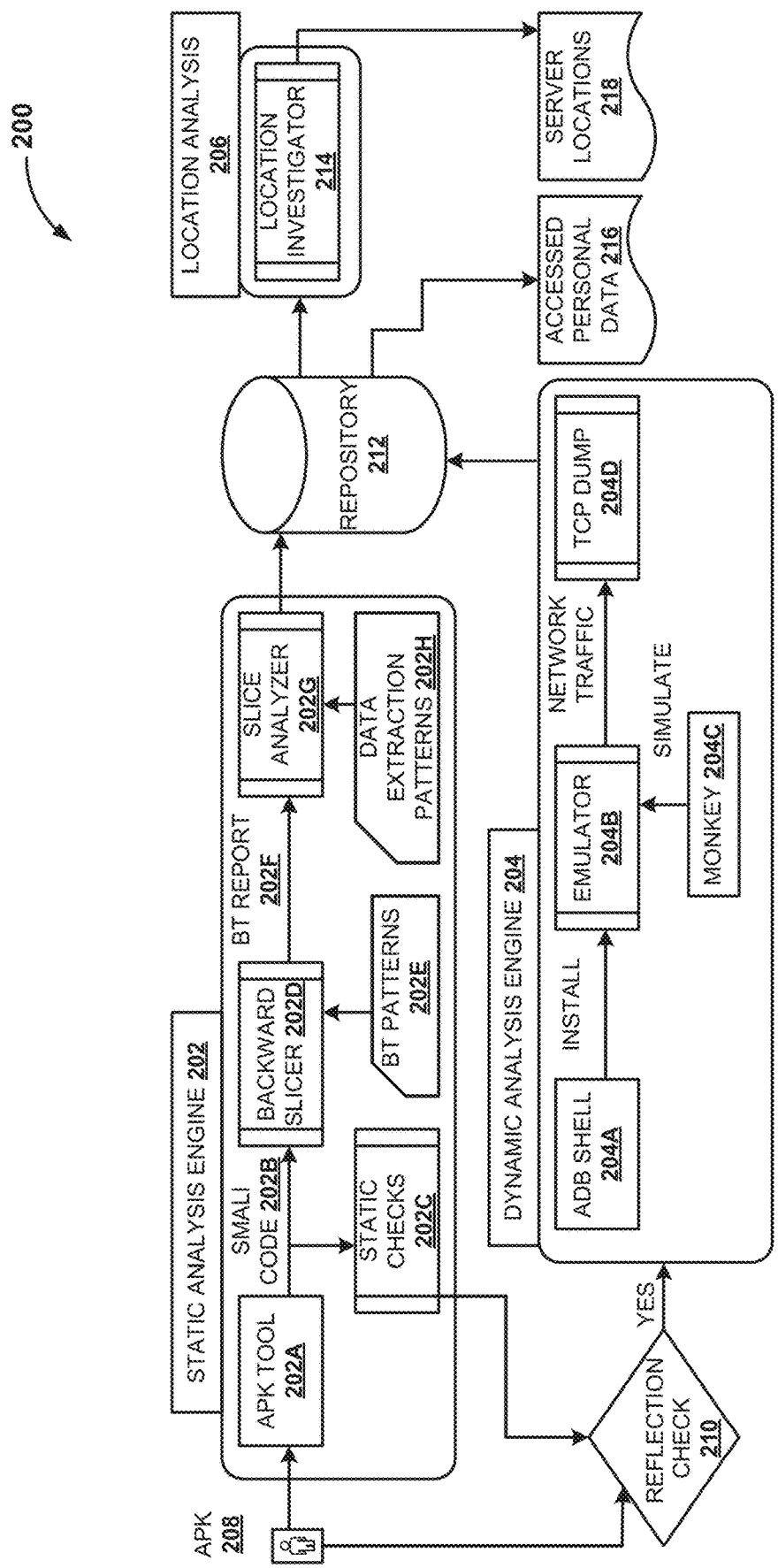
FIG. 2 is a block diagram illustrating a system to analyze a mobile app, according to an embodiment.

FIG. 2 is a block diagram illustrating system 200 to analyze mobile apps, according to an embodiment. In an embodiment, based on multiple sequential analyses, system 200 provides information (e.g., 216, 218) that may be used to determine a compliance or a violation of data protection standards by a mobile app. System 200 may also be referred to as personal data transfer location analyzer (PDTLoc) and the terms may be used interchangeably, in the foregoing description. In an embodiment, PDTLoc 200 may include multiple software components, routines, scripts, software implemented engines, etc. (e.g., 202, 204, 206, and their respective sub-components, as shown in FIG. 2), working either independently or in cooperation with repository 212. Further, the software components, routines, scripts, software implemented engines, etc., may be in communication with repository 212 (e.g., data store, database, data structure, etc.) for executing operations (e.g., storing, retrieving, processing, transferring, etc.) on data.

In an embodiment, the sequential analyses mechanism (e.g., including static analysis or dynamic analysis and location analysis) may be executed by PDTLoc 200 to analyze the mobile app. The sequential analyses mechanism may be instantiated by providing a uniform resource locator (URL) address of the app. In response to the sequential analyses of the app, system 200 may generate graphical visualizations (e.g., bar graphs, pie-charts, etc.) that may be used to determine whether the app complies or violates the data protection standards. In an embodiment, multiple apps may be concurrently analyzed by providing a corresponding URL addresses of the apps. In another embodiment, the apps may be hosted in an application marketplace and may be downloaded into PDTLoc 200 from the corresponding URL. Such marketplace may correspond to a platform that may host software applications that may be downloaded and installed onto any portable electronic devices. In an embodiment, the operational efficacy and functionalities of various components or engines of PDTLoc 200 are described with reference to Android® operation system framework, for illustrative purposes. However, system 200 may be implemented to analyze apps from multiple mobile application distribution platforms provided by multiple entities and based on different operation systems (e.g., Android®, Windows®, iOS®, Ubuntu®, etc.).

In an embodiment, static analysis engine 202 may include an integration of components that may work either independently or in cooperation. For example, static analysis engine 202 may include components, such as, Android Package Kit (APK) Tool 202A, a backward program slicer (backward slicer 202D), static checks 202C component, slice analyzer 202G component, BackTrack (BT) patterns 202E component, data extraction patterns 202H component, etc., that may work either independently or cooperatively, to execute specific operations or functions. In an embodiment, PDTLoc 200 may provide a user interface (not shown) with a data field to input the URL of the app. For example, the app may be stored on a mobile application distribution platform (e.g., Android® apps on Google Play®). Upon inputting the URL address of the app via the user interface, PDTLoc 200 may be initialized and may start execution of analysis of the app. In an embodiment, the initialization of PDTLoc 200 may include downloading the app from the mobile application distribution platform and storing the downloaded mobile app in a cache memory. In an embodiment, the app downloaded from the mobile application distribution platform may be in an APK file format (.apk).

In an embodiment, the static analysis may be performed by static analysis engine 202. The static analysis may include extracting information from source code or bytecode of the app by reading the .apk file (e.g., 208) and extracting the URLs and/or Internet Protocol (IP) addresses of the destination servers embedded in the .apk file (e.g., 208). Such URLs and/or IP addresses may be associated with servers, to which the app may transfer data. In an embodiment, .apk file (e.g., 208) of the app may include compiled software code that may be executed to provide specific operations or functions. For example, the app may include software code in Java® programming language, compiled into bytecode executable by Android® operating system runtime environment such as Dalvik, and compiled classes may be bundled into another Dalvik executable (.dex) file, for example 'classes.dex' file. To analyze the 'classes.dex' file, static analysis engine 202 may extract and transform the compiled Dalvik bytecode into Smali language code 202B via APK Tool (e.g., 202A) component. In an embodiment, Smali code 202B may represent disassembled or decompiled Dalvik bytecode. The static analysis engine 202 may perform analyses of the decompiled Dalvik bytecode. In an embodiment, static checks 202C component may inspect Smali code 202B to determine the use of reflection check (e.g., 210). Reflection is a programming feature that enables the apps to operate on strings, which may include instantiating objects of a class, invoke functions or methods and access/modify the fields where the class, method and field names, etc., are represented by strings that may not be readily available for the static analysis. In an embodiment, when the app includes java.lang.reflect package provided by the Android® framework, the app may be marked for use of reflection. The Smali code in the app may be traversed to identify or determine the inclusion java.lang.reflect package. For example, when the app includes code snippet:

ClassName className=new ClassName( );
className.unsubscribe( ); the app may not be marked for use of reflection. In an embodiment, when the app is not marked for the use of reflection, PDTLoc 200 may perform or execute static analysis of the app.

For example, when the app includes code snippet:
Object className=ClassName.class.newInstance( );
Method m=className.getClass( ).getDeclaredMethod ("unsubscribe", new Class[0]);
m.invoke(className); the app may be marked for use of reflection.

In an embodiment, static analysis engine 202 may include backward slicer 202D component that may implement a mechanism to perform backward program slicing on Small code 202B. In the bytecode representation of the app (e.g., Smalli code 202B), operations may be executed on the data stored in data structures, for example, stack and register. Operations may be executed on the stack or register variables using program instructions ('1'). In an embodiment, backward program slicer component may be executed to analyze dataflow from a register ('r') used at a point ('P') in the program, when all instructions 'I' are executed before 'P' and have direct or indirect effect on register 'r' at point 'P.' A combination of 'r' and 'P' may form a criterion for slicing, when the set of instructions 'I' that affect the value of 'r' at 'P' may be referred to as a backward slice (also referred to as backward program slice).

FIG. 3 is an exemplary illustration of a code snippet of a backward program slice, according to an embodiment. FIG. 3 shows a backward program slice corresponding to a variable 'Sum'. For example, lines 2-6 and line 9 in the code snippet shown in FIG. 3 may represent the backward program slice corresponding to variable 'Sum', used at line 9 (point 'P'). In an embodiment, a backward program slice starts from a sink application programming interface (API). An inspection (or analysis) of the backward program slice corresponding to a register may provide information about the dataflow path between the sink API and source API. In an embodiment, the source API may represent a point at which personal data or personal information is retrieved and the sink API may represent a point to which the personal data or personal information is transferred. The sink API may include external servers (e.g., on premise or cloud computing based communication nodes) with which the app communicates. In an embodiment, the source API and sink API that may be selected for analysis (e.g., static analysis, dynamic analysis and location analysis) may be a representative list of APIs which can be used by the apps that may retrieve and transfer personal data to remote servers. For example, certain apps may include sink APIs and source APIs that may cooperatively share and transfer data to another remote location or remote server. In an embodiment, the backward program slicing mechanism may analyze: whether the app accesses personal data and subsequently determine whether the app transfers or does not transfer, the personal data to the remote servers. In an embodiment, backward slicer component (e.g., 202D, FIG. 2) may perform the backward program slicing to determine the flow of information or dataflow to certain sink APIs. The backward slicer component (e.g., 202D) may further implement an analysis extension, for example, Static Android Analysis Framework (SAAF) for extracting backward program slices corresponding to certain sink APIs.

FIG. 4 is an exemplary illustration of a table including sink application programming interfaces, according to an embodiment. FIG. 4 shows Table 1 that includes sink APIs. The columns 402, 404 and 406 of Table 1 respectively include information of class, method and parameter. The column 406 includes corresponding parameter values related to sink APIs that may be used to perform or execute the static analysis. In an embodiment, backward slicer 202D component of FIG. 2 may receive the sink APIs in the form of an extensible markup language (.xml) file that may also be referred to as BackTrack (BT) patterns (e.g., 202E). The BT patterns (e.g., 202E) may provide information about the sink APIs including class (e.g., column 402 of Table 1 in FIG. 4), method name (e.g., column 404 of Table 1 in FIG. 4), position of the parameters and types of parameters (e.g., column 406 of Table 1 in FIG. 4).

FIG. 5 is an exemplary illustration of a code snippet that implements a backward slicer to execute a backward program slice, according to an embodiment. FIG. 5 shows a code snippet that may instantiate or instruct backward slicer (e.g., 202D, FIG. 2) to backtrack parameter set to value '0', which is of type Ljava/lang/String; of 'setURL' method of class 'org/apache/heap/client/methods/HttpPost'. In an embodiment, information about the other APIs, for example, as listed in Table 1 in FIG. 4, may be provided to backward slicer (e.g., 202D) and backward program slice mechanism may be executed for a corresponding sink APIs. In an embodiment, backward slicer 202D may determine the position of a given BT patterns (e.g., 202E) in Smali code (e.g., 202B), may execute or perform backtracking of the target parameter, and may extract the corresponding slice of code (also referred to as code slice). In an embodiment, a code slice may include all the code statements that have a direct and/or indirect impact on a data structure (e.g., register) storing the value of the target parameter.

FIG. 6 is an exemplary illustration of a code snippet for execution of backtracking, according to an embodiment. FIG. 6 shows a code snippet that may be executed on the bytecode or source code of the app. For example, code snippet shown in FIG. 6 may implement mechanism for a backward slice corresponding to API 'java/net/URL;-><init>'. In an embodiment, a code slice may represent a BT pattern, that may be extracted in the form of a BT report (e.g., 202F, FIG. 2) and provided for further analysis to slice analyzer component (202G). The slice analyzer component (202G) traverses the code slices and extracts the URLs and/or IP addresses, to which user's personal data may be transferred. The slice analyzer component (202G) may be configured to analyze the code slices for certain data extraction patterns (e.g., 202H) that may be extracted and may represent an access of the personal data.

FIG. 7 is an exemplary illustration of a table including sources of personal data or personal information, according to an embodiment. In an embodiment, the entries shown in Table 2 in FIG. 7 correspond to APIs that may be used to extract a user's personal data. For example, a typical data extraction pattern may include a class (e.g., 702), a method (e.g., 704), parameter (e.g., 706) and parameter example (e.g., 708) as shown in Table 2 in FIG. 7. A slice analyzer component (e.g., 202G in FIG. 2) may selectively not analyze information related to other methods of acquiring personal data. For example, slice analyzer component (e.g., 202 in FIG. 2) may not analyze data input through text or data fields and stored in files of the mobile device. In an embodiment, slice analyzer component (e.g., 202G) may be configured to generate a mapping information of the access to the personal data by the app, and to determine the jurisdictions and/or locations of the server to which the app may have transferred the personal data. In an embodiment, the mapping information may include the dataflow paths that may correspond to URLs and/or IP addresses (e.g., of remote servers) to which the personal data may be transferred. Based on the URLs and/or IP addresses to which personal data is transferred, whether the app violates or complies with the data protection standards may be determined. In an embodiment, information including the number of apps that may violate or comply with the data protection standards may be stored in a repository (e.g., 212).

In an embodiment, dynamic analysis of the app may be performed, when the apps are using reflection. For example, when it may be determined that the apps are using reflection during the static analysis, PDTLoc (e.g., 200, FIG. 2) may instantiate a dynamic analysis engine 204 to perform dynamic analysis of the apps. In an embodiment, determining or marking the apps for using reflection may correspond to programming features, when the app is enabled or includes source code to operate on strings. For example, such operations on strings may include instantiating objects of a class, invoking functions or methods and accessing/modifying the fields where the class, method and field names, etc., that are represented by strings. In an embodiment, dynamic analysis engine 204 may be configured to perform dynamic analysis and determine the dataflow paths that may be concealed or were not determined, during the static analysis.

In an embodiment, the instantiation of dynamic analysis engine 204 may execute operations or functions including: executing the app under analysis (e.g., execute the app in an emulator environment); monitoring the network traffic generated by the app; determining the URLs and/or IP addresses of the servers to which the personal data was transferred, etc. In an embodiment, the dynamic analysis performed by the dynamic analysis engine 204 may be instantiated in a mobile emulator environment (e.g., emulator 204B) working in cooperation with Android Debug Bridge (ADB) shell 204A in the PDTLoc 200. For example, emulator 204B may replicate a runtime behavior of the app, such that the app was installed and executed from a mobile device. In an embodiment, a sandbox environment including a containerized system may be provided to execute the app under analyses. The ADB shell 204A may facilitate installation of the app and communication with emulator 204B. In an embodiment, dynamic analysis engine 204 may monitor the resources of the mobile device (via emulator 204B) that are accessed by the app, for example, filesystem, network, etc. The emulator 204B may provide a platform of the runtime mobile environment by establishing connection with the Internet (e.g., via Wi-Fi) and providing location information of the app by turning on global positioning system (GPS), etc. In an embodiment, a tool or commands for analyzing or monitoring the network traffic, for example, tcpdump tool 204D working in cooperation with emulator 204B may monitor the network traffic. The app may be executed to simulate runtime behavior using a tool, for example, Monkey® tool 204C working in cooperation with emulator 204B. The Monkey® tool 204C may execute the runtime behavior of the app by mimicking user actions such as touch, drag, type, change screen orientation, etc. This mechanism may be referred to as auto-dynamic as it uses Monkey® tool 204C to simulate the execution of the app. The above real-time emulation and monitoring activities may provide the information related to transferring personal data to remote servers, the type of and/or volume of network traffic generated when the app is executed, the dataflow paths through which data is transferred, etc. The provided information may be stored in repository 212. In an embodiment, the results of the dynamic analysis performed by dynamic analysis engine 204 may be used independently or in conjunction with the results of the static analysis performed by static analysis engine 202. In an embodiment, the results of dynamic analysis performed by dynamic analysis engine 204 may include, for example, dataflow paths when the apps are marked for using reflection. For example, the dynamic analyzer engine may perform analysis of the dataflow paths and may determine specific patterns, that may include patterns "lat=[\.\-0-9]*'", "city=[a-Z]*'", "deviceIds=[0-9]*'", "macaddress=[0-9a-f]*'", etc.

In an embodiment, the dynamic analysis of the app may further include analyzing programming features associated with the app. For example, such programming features may include various types of codes and data obfuscation, using reflection, dynamic code loading, etc. The dynamic code loading may enable the app to extend its code base, upon installation or deployment on the mobile device. Since the above described objects, functions, fields, etc., are not be accessible for analysis when performing static analysis of the app, dynamic analysis may be performed by dynamic analysis engine 204 to provide information on critical dataflow and transfer of sensitive information (e.g., personal data) to remote servers.

In an embodiment, location analysis 206 may be performed by location investigator engine 214 as shown in FIG. 2. The location investigator engine 214 in the PDTLoc 200 may work in cooperation with repository 212 storing the results or information of the above described analyses (e.g., static analysis and dynamic analysis). The location investigator engine 214 may be configured to determine physical locations of the remote servers with which the app communicates, e.g., accesses and/or communicates and/or transfers data. The physical locations may be represented by URLs and/or IP addresses, dataflow paths, etc., that were extracted during the static analysis and dynamic analysis of the app. In an embodiment, location investigator engine 214 may communicate (e.g., establish a connection) with external repositories and/or service providers (not shown) to extract information related to geographical locations of the servers. The location investigator engine 214 may communicate with the service providers and based on the correspondence between the extracted URLs and/or IP addresses and the information provided by the external information repository and/or service providers, the geographical locations to which the personal data is transferred may be determined. The location investigator engine 214 may be configured to perform information or data "leakage" analysis. Such information leakage analysis may include determine data flows, information leakage, data transfers to third party apps and/or remote server locations. In an embodiment, location investigator engine 214 may be configured with attributes or parameters compliant with the data protection standards (e.g., EU GDPR art 44) for certain jurisdictions. In an embodiment, based on the results of the static analysis, the results of the dynamic analysis and the location investigation analysis, location investigator engine 214 may determine the violation or compliance of the apps by comparing the attributes or parameters of the data protection standards with the dataflow information extracted from the static analysis and the dynamic analysis.

In an embodiment, the apps for performing the above described analyses (e.g., static analysis, dynamic analysis, location analysis) may be selected based on information obtained via mobile application analytics platform (e.g., AppFigures). For example, such mobile application analytics platform may monitor and track the apps, generate and maintain statistics based on downloads, sales, etc., of the apps via the mobile application distribution platforms. In an embodiment, the apps may further be selected for analyses based on a criterion. For example, such criterion may include: determining an availability of the apps on multiple application distribution platforms, prior or historic data transfer information of the apps (e.g., communication of the apps with remote servers deployed either on premise or in cloud computing environment), etc.

In an embodiment, a crawler engine (not shown) working cooperatively with PDTLoc 200 may be configured to retrieve and analyze information related to the apps monitored by the mobile analytics platform. Further, the crawler engine may be configured to determine an availability of an URL for an app and facilitate or provide framework for downloading the app from the URL. In an embodiment, the crawler engine may cooperatively work with a malware detection system (e.g., the malware detection system may be provided by an external service provider or may be integrated in the framework analyzing the selected mobile applications) to determine anomalies in the app (e.g., presence of any malware or viruses in the app) before downloading the app.

FIG. 8 is an exemplary illustration of a table including personal data stored on a mobile device, according to an embodiment. In an embodiment, column 'CATEGORY' 802 may include categories 'CONTENT', 'DEVICE' and 'NETWORK', and column 'INFORMATION' 804 may include corresponding categorical information. For example, category 'CONTENT' may include corresponding information, such as 'calendar', 'contacts', 'audio', 'video', 'images' 'files', etc.; the category 'DEVICE' may include corresponding information, such as 'device ID', 'online accounts', 'system alarm', etc.; the category 'NETWORK' may include corresponding information, such as 'medium access control (MAC) address', 'proxy settings', 'network status', etc.

FIG. 9 is an exemplary graphical illustration including of the apps that access personal information or personal data, according to an embodiment. The X-axis in FIG. 9 represents type or category of personal information or personal data (e.g., content, network, device, location, etc.). The Y-axis represents percentage of apps accessing the respective personal information or personal data. In an example, to demonstrate the operational efficacy and functionality of PDTLoc 200, 1,498 apps were analyzed by PDTLoc 200. The apps were selected based on the previously described criterion targeting specific geographic region. Particularly, apps that were commonly used in the European Economic Area (EEA) were selected and analyzed by PDTLoc 200. The results of the static analysis, dynamic analysis, and location analysis are represented as graphical visualizations. For example, the result of the analyses is shown as a bar graph in FIG. 9. In an embodiment, it may be determined that about 75% of the apps request for device location, about 65% of the apps request for network information, and approximately 70% of the apps access content (e.g., 'CONTENT' as shown in Table 3 of FIG. 8) that may be tagged as sensitive information.

Figure 10:
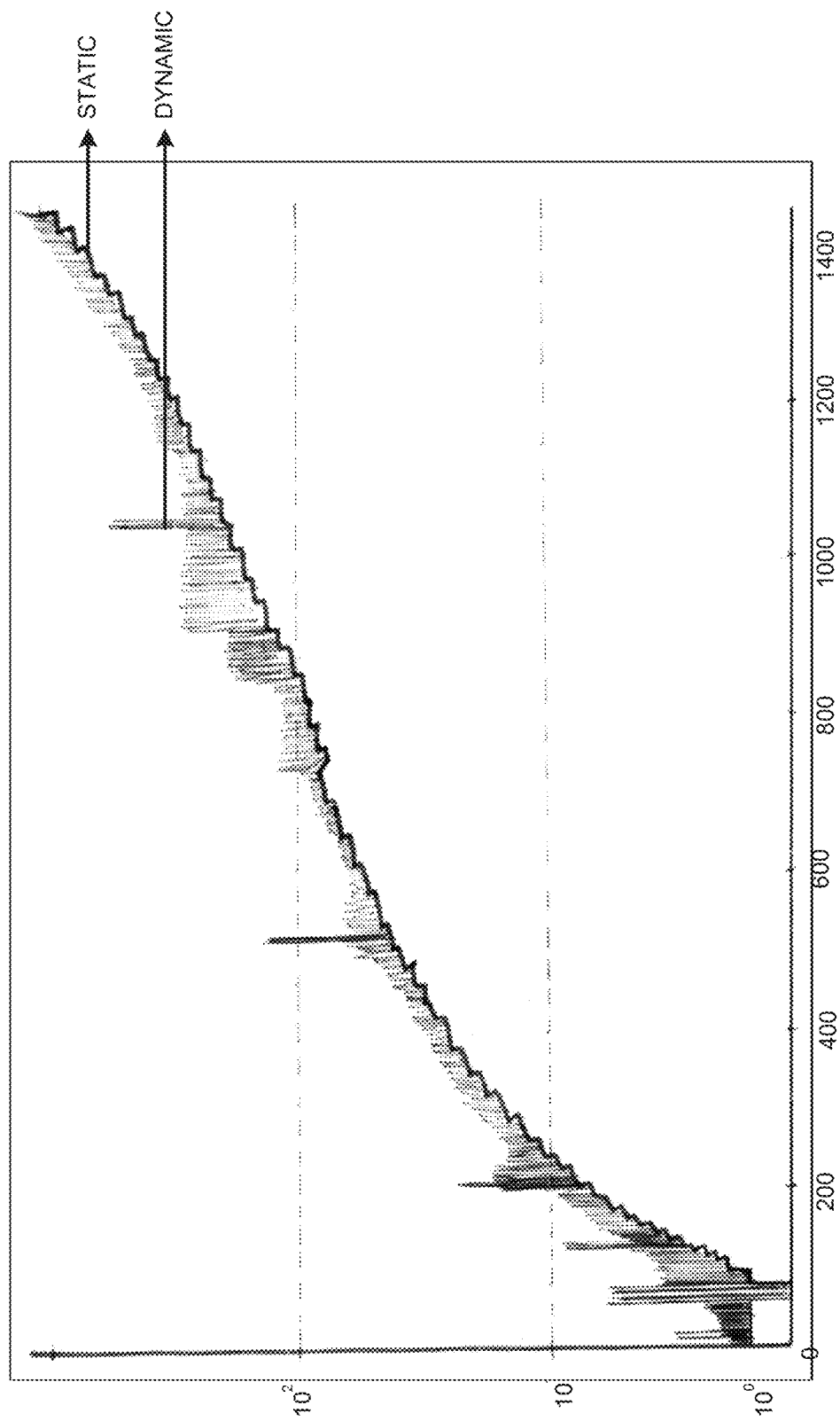
FIG. 10 is an exemplary graphical illustration showing an auto-dynamic analysis including static analysis and dynamic analysis, according to an embodiment.

FIG. 10 is an exemplary graphical illustration showing an auto-dynamic analysis including static analysis and dynamic analysis, according to an embodiment. As described previously, the operational efficacies and functionalities of PDTLoc 200 include analyses of 1, 498 apps used in the EEA. In an embodiment, in response to the analyses by the PDTLoc 200, the respective results of static analysis and dynamic analysis included or extracted 1,35,000 and 21,000 valid URLs and/or IP addresses. In an embodiment, the static analysis generates an approximation of the valid URLs and/or IP addresses which may actually not be accessed by the app, when the app is executed. In an embodiment, by using a combination of the results of the static analysis and the dynamic analysis, the information generated by PDTLoc 200 may provide an insight for performing wider range of analysis. FIG. 10 shows a graph including values of the dynamic analysis engine and the static analysis engine. The values corresponding to the static analysis in FIG. 10 indicate a number of URLs when the apps were analyzed and the values corresponding to the dynamic analysis indicate new unique URLs that were discovered or determined when the dynamic analysis was performed. In an embodiment, the number of new URLs and/or IP addresses discovered or determined during the dynamic analysis is higher in comparison to the static analysis. Further, it may be determined that the relation between remote servers and URLs and/or IP addresses is one to many, that is, on each server there may be multiple resources represented by different URLs. In an embodiment, PDTLoc 200 may extract dataflow paths only for specific portions for all the URLs.

Figure 11B:
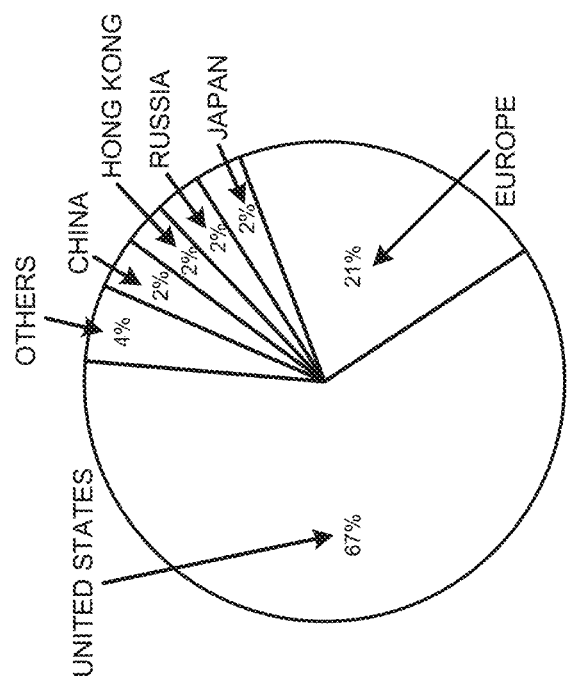
FIG. 11B is an exemplary graphical illustration showing a distribution of locations to which personal data or personal information was transferred, according to an embodiment.
Figure 11A:
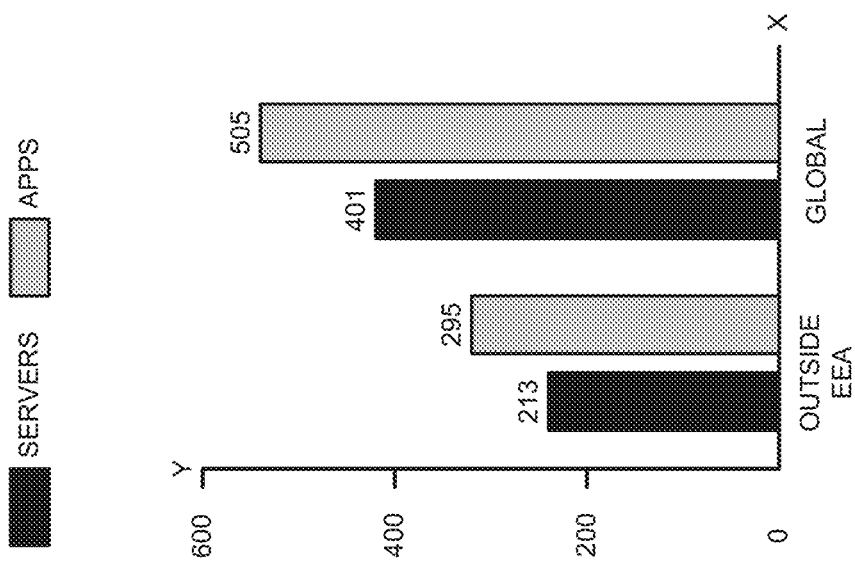
FIG. 11A is an exemplary graphical illustration including number of servers and apps, according to an embodiment.

FIG. 11A is an exemplary graphical illustration including number of servers and apps, according to an embodiment. As shown in FIG. 11A, the bar graphs show the number of servers hosted outside EEA (e.g., remote servers) and the number of apps that transferred and/or accessed the remote servers. As indicated, approximately about 20% of the 1, 498 apps that were analyzed by PDTLoc 200 (as explained in FIG. 2), transferred personal information or personal data and/or accessed remote servers. Globally about 401 remote servers were the recipients of the data (e.g., personal data) transferred by the apps and about 213 servers were outside EEA.

FIG. 11B is an exemplary graphical illustration showing a distribution of locations to which personal data or personal information was transferred, according to an embodiment. FIG. 11B shows a pie-chart including a distribution of locations to which an EEA user's personal information or personal data was transferred. In an embodiment, the statistics shown in FIG. 11B indicates the physical locations hosting the remote servers. The apps that were analyzed transmitted personal information or personal data to the remote servers that were deployed or hosted in different countries (e.g., jurisdictions or geographical locations). As shown in FIG. 11B, approximately 23% of the servers, to which the personal information or personal data was transferred, were hosted in EEA and about 67% of the servers to which the personal information or personal data was transferred, were hosted in the United States (US). Likewise, FIG. 11B shows the jurisdictions (e.g., Japan, China, Hong Kong, Russia, etc.) to which the personal information or personal data was transferred by the apps.

Figure 12B:
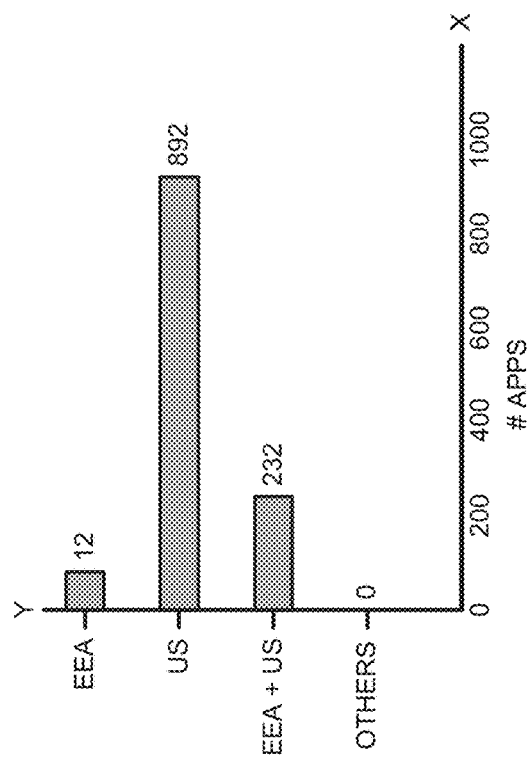
FIG. 12B is an exemplary graphical illustration of showing the apps communicating with servers hosted in EEA and US, according to an embodiment.
Figure 12A:
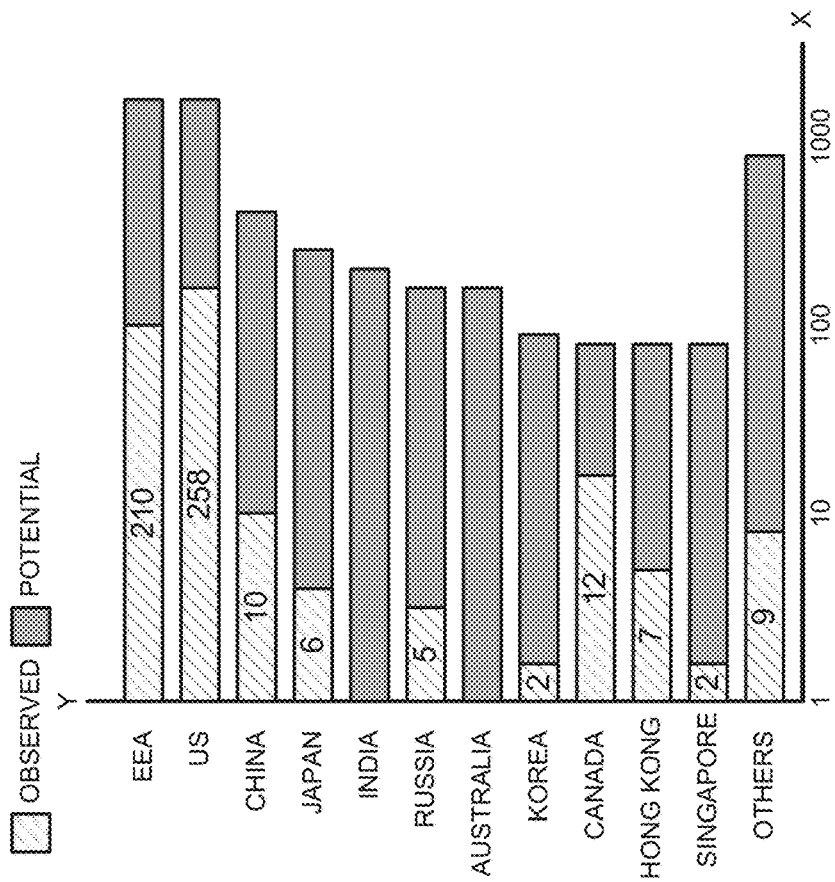
FIG. 12A is an exemplary graphical illustration of the country wise distribution of servers based on the number of apps, according to an embodiment.

FIG. 12A is an exemplary graphical illustration of the country wise distribution of servers to which personal data or personal information was transferred, according to an embodiment. Based on the information shown in FIG. 12A, it may be determined that the apps communicated (e.g., observed and/or potential data transfer to the servers) include outside the EEA and US. Based on the analysis (e.g., static analysis, dynamic analysis and location analysis) by PDTLoc 200, it may be determined that the apps communicated with remote hosted servers, for example, China. Japan, India, Russia, etc. The distribution of observed and/or potential data transfer to servers is as shown in FIG. 12A.

FIG. 12B is an exemplary graphical illustration of showing the apps communicating with servers hosted in EEA and US, according to an embodiment. FIG. 12B shows the number of apps exclusively contacting servers located in the EEA and the US and other countries. As shown in FIG. 12B, approximately 1% of the apps (e.g., 12 apps) communicated (e.g., accessed and/or transferred personal information or personal data) with servers located in the EEA and about 892 apps communicated with servers that were hosted in the US. From the above information, it may be determined that the apps that communicated with servers hosted in the US may have primary data centers and infrastructure for processing data assimilated from the apps, are located in the US. Similar reasoning may be applied for other apps, that may be communicating with the servers hosted in the EEA and/or US. As shown in FIG. 12B, the number of apps exclusively contacting servers in the EEA and the US is about 232.

Figure 13A:
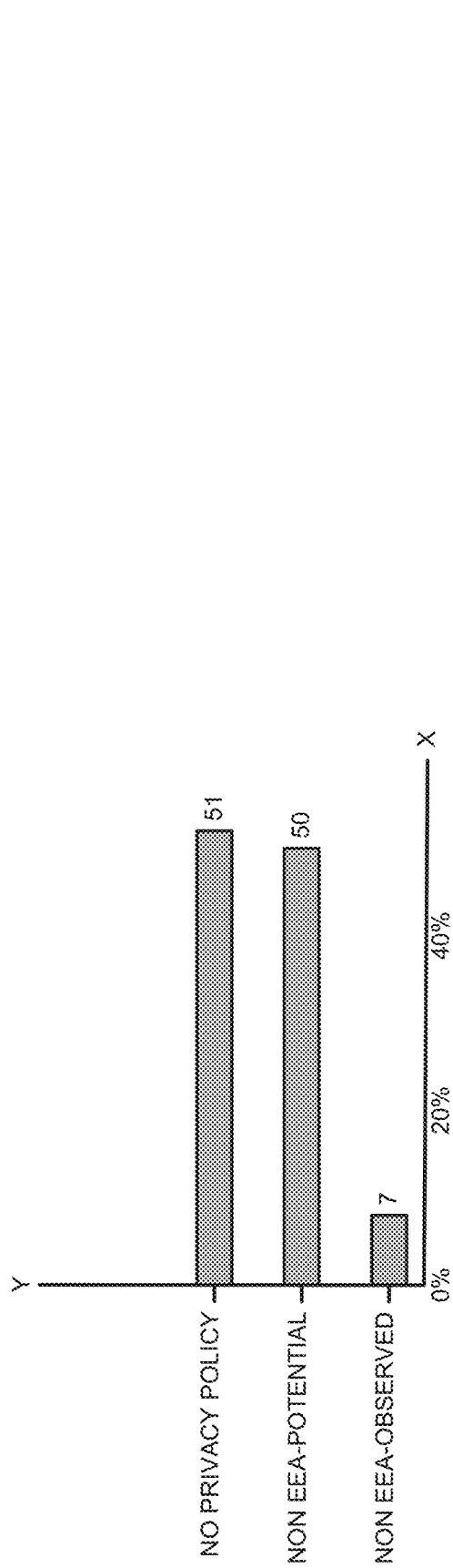
FIG. 13A-FIG. 13B are exemplary graphical illustrations of analyses of apps, according to an embodiment.
Figure 13B:
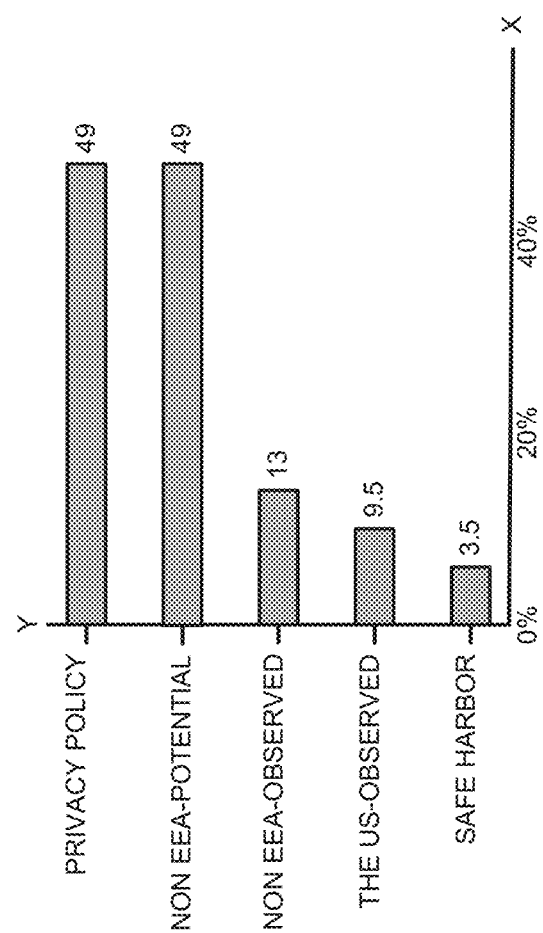

FIG. 13A-FIG. 13B are exemplary graphical illustrations of analyses of apps, according to an embodiment. As explained with reference to FIG. 2, the apps may be analyzed by PDTLoc and information related to data transfers to remote servers, may be provided. Such information may be used to determine whether the apps comply or violate data protection standards for a certain jurisdiction (e.g., EEA). FIG. 13A shows the number of apps that violated the data protection standards (e.g., no privacy policy, non-EEA-Potential, non-EEA-Observed), because these apps transferred personal data or personal information to remote servers that were hosted outside the restricted jurisdictions (e.g., EEA). FIG. 13B shows the apps that comply with the data protection standards (e.g., provide privacy policy, non-EEA-Potential, Non-EEA-Observed, the US-Observed, Safe Harbor, etc.).

Figure 14:
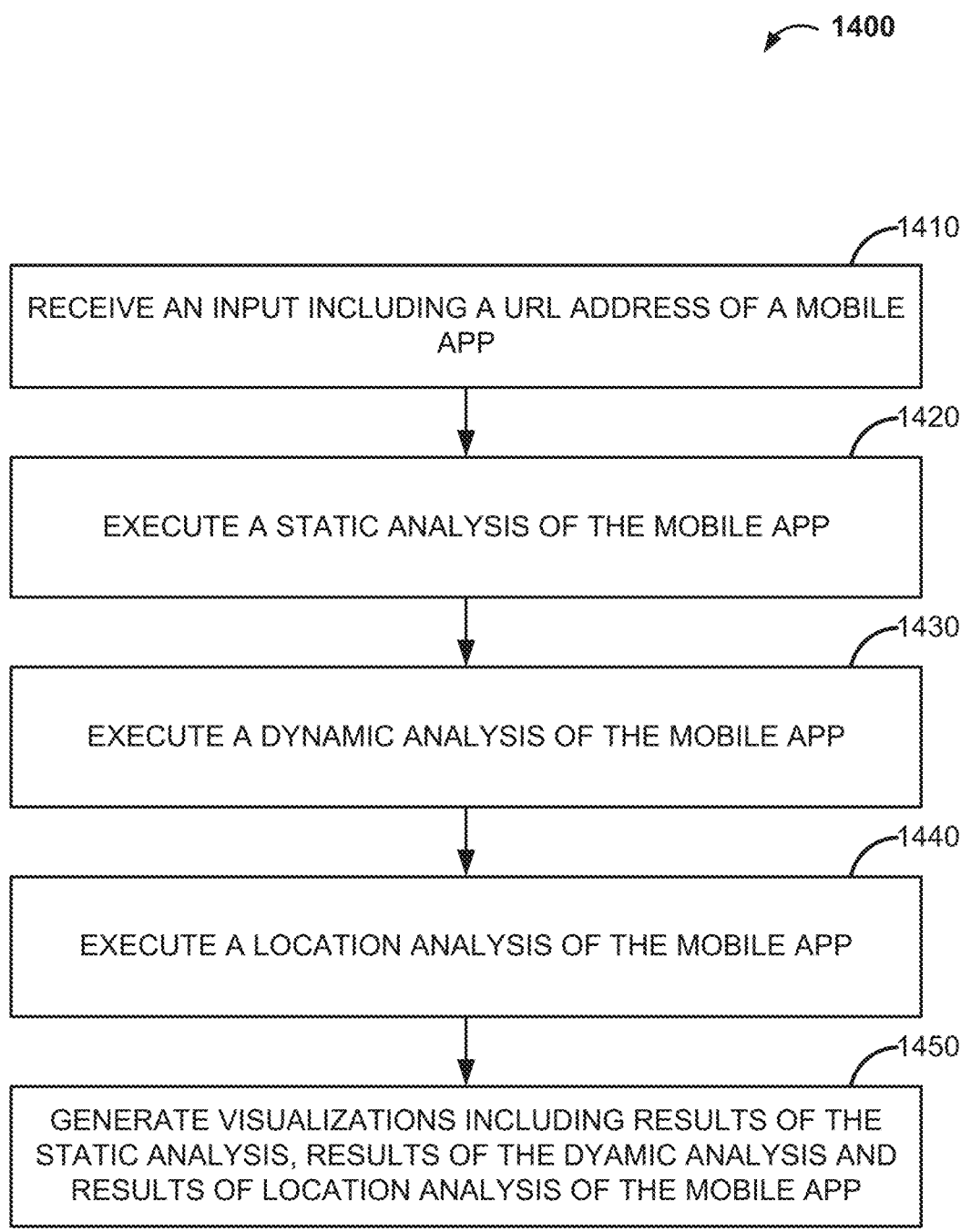
FIG. 14 is a flow diagram illustrating a process to analyze a mobile app, according to an embodiment.

FIG. 14 is a flow diagram illustrating process 1400 to analyze a mobile app, according to an embodiment. In an embodiment, process 1400 may implement a mechanism to analyze a mobile app. An input including URL address of a mobile app is received, at 1410. The URL address may be associated with the mobile app stored on a mobile application distribution platform. Upon receiving the URL address, the mobile app may be downloaded. In an embodiment, a static analysis to analyze the mobile app is executed, at 1420. The static analysis may be performed or execute by a static analysis engine, as explained previously. A dynamic analysis to analyze the mobile app is executed, 1430. The dynamic analysis may be performed or executed by the dynamic analysis engine, as explained previously. A location analysis to execute the mobile app is executed, at 1440. The location analysis is performed or execute by location analysis engine (e.g., location investigation analysis), as explained previously. Multiple visualizations including results of static analysis, results of dynamic analysis and results of location analysis is generated, at 1450. Based on the generated visualizations, whether the mobile app complies or violates data protection standards may be determined.

In an embodiment, the above described PDTLoc provides a platform for analyzing and tracking transfer of personal data or personal information by the apps. For example, the determination of dataflow paths may include determining the URLs and/or IP addresses, to which personal data was transferred from the apps on the mobile devices. The data was transferred to remote servers that may be deployed on premise or in cloud computing environment. Further, the analyses (e.g., static analysis, dynamic analysis, location analysis) performed by PDTLoc 200 may be used for analyzing data transfers or flow of information between trans borders. Such an analysis may be advantageous as it may provide an insight of potential data leaks and may be used as a basis for devising regulatory policies and standards for future digital evolutions. In an embodiment, the functional efficacies, operations, etc., with reference to analyses and report provided by PDTLoc 200 that are described above, may be extended to perform or analyze other types of data (e.g., any data that may be stored and/or accessed by mobile device or the apps).

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 15:
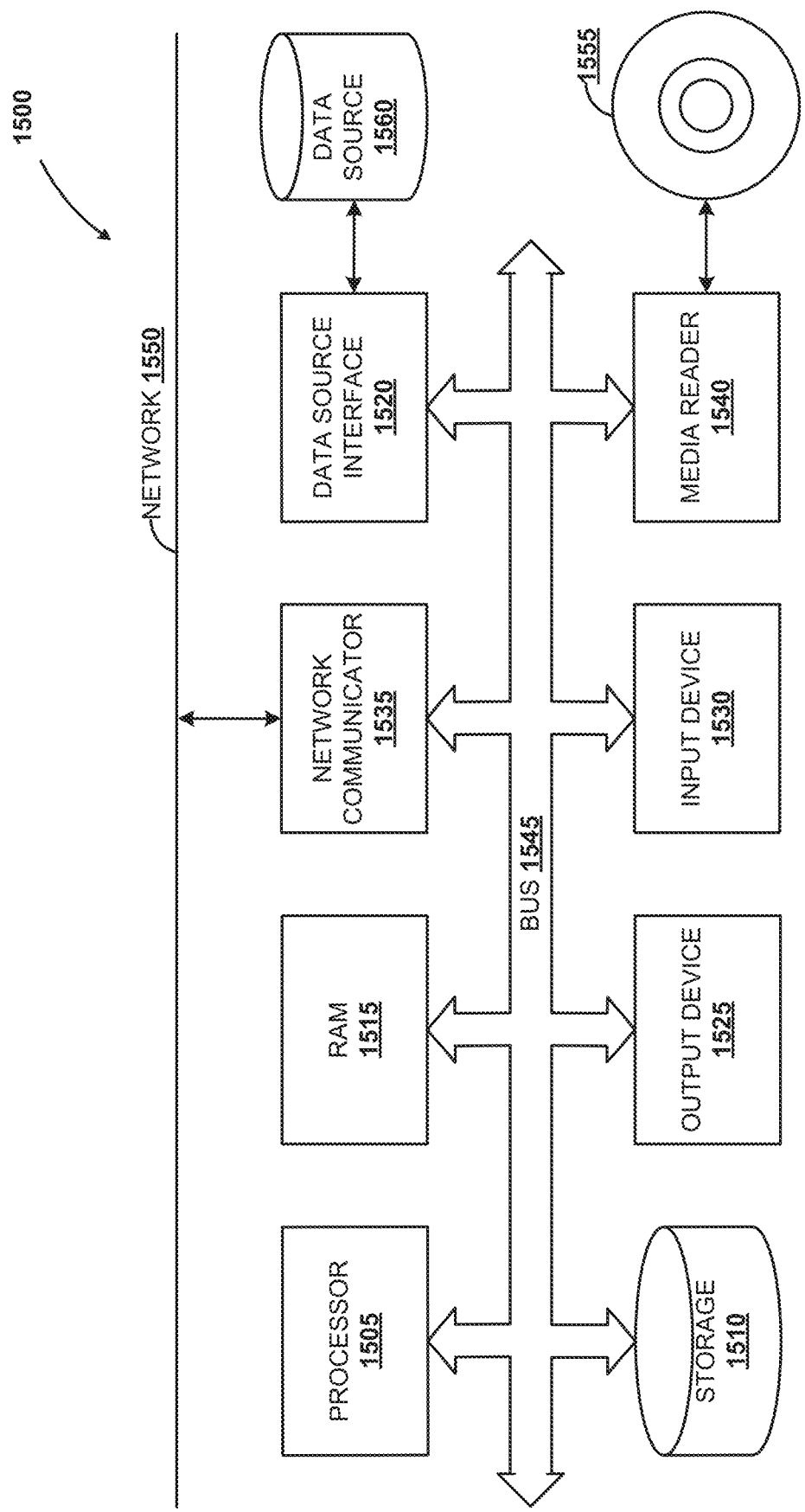
FIG. 15 is a block diagram illustrating a computer system, according to an embodiment.

FIG. 15 is a block diagram illustrating a computer system 1500, according to an embodiment. Computer system 1500 includes processor 1505 that executes software instructions or code stored on computer readable storage medium 1555 to perform the above-illustrated methods. Processor 1505 can include a plurality of cores. Computer system 1500 includes media reader 1540 to read the instructions from computer readable storage medium 1555 and store the instructions in storage 1510 or in random access memory (RAM) 1515. Storage 1510 provides a large space for keeping static data where at least some instructions could be stored for later execution. According to some embodiments, such as some in-memory computing system embodiments, RAM 1515 can have sufficient storage capacity to store much of the data required for processing in RAM 1515 instead of in storage 1510. In some embodiments, all of the data required for processing may be stored in RAM 1515. The stored instructions may be further compiled to generate other representations of the instructions and dynamically stored in RAM 1515. Processor 1505 reads instructions from RAM 1515 and performs actions as instructed. According to one embodiment, computer system 1500 further includes output device 1525 (e.g., a display) to provide at least some of the results of the execution as output including, but not limited to, visual information to users and input device 1530 to provide a user or another device with means for entering data and/or otherwise interact with computer system 1500. Each of these output devices 1525 and input devices 1530 could be joined by one or more additional peripherals to further expand the capabilities of computer system 1500. Network communicator 1535 may be provided to connect computer system 1500 to network 1550 and in turn to other devices connected to network 1550 including other clients, servers, data stores, and interfaces, for instance. The modules of computer system 1500 are interconnected via bus 1545. Computer system 1500 includes a data source interface 1520 to access data source 1560. Data source 1560 can be accessed via one or more abstraction layers implemented in hardware or software. For example, data source 1560 may be accessed by network 1550. In some embodiments data source 1560 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer system to analyze a mobile app, comprising:
   a memory storing computer instructions; and
   a hardware processor communicatively coupled with the memory to execute the instructions to:
   instantiate a static analysis engine to perform a static analysis of program code of the mobile app to determine a source application programming interface representing a point of the program code at which personal data is retrieved and a sink application programming interface associated with the source application programming interface and representing an external server to which the personal data is transferred, and to determine whether the mobile app is enabled to instantiate objects of a class, invoke functions, invoke methods, and access fields, where the name of the class, the names of the functions, the names of the methods, and the names of the fields are represented by strings;
   in response to a determination, during the static analysis, that the mobile app is enabled to instantiate objects of a class, invoke functions, invoke methods, and access fields, where the name of the class, the names of the functions, the names of the methods, and the names of the fields are represented by strings, instantiate a dynamic analysis engine to perform a dynamic analysis of the mobile app, based on a runtime behavior of the mobile app, to identify transfer of personal data to a remote server during execution of the mobile app;
   instantiate a location analysis engine to determine physical locations of the external server and the remote server; and
   based on the physical locations of the external server and the remote server, determine whether the mobile app complies with or violates one or more data protection standards.

2. The computer system of claim 1, wherein the static analysis of the program code of the mobile app by the static analysis engine, comprises:
   decompile the mobile app;
   execute a backward program slicing of the decompiled mobile app to determine dataflow;
   execute a slice analyzer to traverse the decompiled mobile app and extract one or more uniform resource locations or one or more internet protocol addresses; and
   store information including the extracted one or more uniform resource locations or the extracted one or more IP addresses from the static analysis in a data store.

3. The computer system of claim 1, wherein the dynamic analysis of the mobile app by the dynamic analysis engine, comprises:
   execute the mobile app;
   monitor a network traffic including dataflow in response to the execution of the mobile app; and
   determine one or more uniform resource locators or one or more internet protocol addresses corresponding to the monitored dataflow mobile app.

4. The computer system of claim 1, wherein determination of physical locations by the location analysis engine, comprises:
   establish a connection with one or more external repositories storing information related to one or more geographical locations; and
   based on a determined one or more uniform resource locators or one or more internet protocol addresses in response to the static analysis and the dynamic analysis, determine one or more physical locations of a data transfer.

5. The computer system of claim 1, further comprising:
   instantiate a sandbox environment including a containerized system comprising a mobile emulator to emulate a runtime behavior of an end user's device including an execution of the mobile app.

6. The computer system of claim 1, wherein the dynamic analysis further comprises:
   analyze one or more programming features associated with the mobile app, wherein the one or more programming features is selected from a group consisting of one or more types of code, a data obfuscation, a reflection, and a dynamic code loading.

7. The computer system of claim 1, wherein determining whether the mobile app violates or complies with one or more data protection standards is based on a plurality of visualizations including results of the static analysis and results of the dynamic analysis.

8. A non-transitory computer readable storage medium tangibly storing instructions, which when executed by a computer, cause the computer to execute operations comprising:
   instantiate a static analysis engine to perform a static analysis of program code of a mobile app to determine a source application programming interface representing a point of the program code at which personal data is retrieved and a sink application programming interface associated with the source application programming interface and representing an external server to which the personal data is transferred, and to determine whether the mobile app is enabled to instantiate objects of a class, invoke functions, invoke methods, and access fields, where the name of the class, the names of the functions, the names of the methods, and the names of the fields are represented by strings;

in response to a determination, during the static analysis, that the mobile app is enabled to instantiate objects of a class, invoke functions, invoke methods, and access fields, where the name of the class, the names of the functions, the names of the methods, and the names of the fields are represented by strings, instantiate a dynamic analysis engine to perform a dynamic analysis of the mobile app, based on a runtime behavior of the mobile app, to identify transfer of personal data to a remote server during execution of the mobile app;

instantiate a location analysis engine to determine physical locations of the external server and the remote server and based on the physical locations of the external server and the remote server, determine whether the mobile app complies or violates one or more data protection standards.

9. The non-transitory computer readable storage medium of claim 8, where the instructions, when executed by a computer, further cause the computer to execute operations for performing static analysis of the mobile app, comprising:
decompile the mobile app;
execute a backward program slicing of the decompiled one mobile app to determine dataflow;
execute a slice analyzer to traverse the decompiled mobile app and extract one or more uniform resource locators or one or more internet protocol addresses; and
store information including the extracted one or more uniform resource locators or the extracted one or more internet protocol addresses from the static analysis in a data store.

10. The non-transitory computer readable storage medium of claim 8, where the instructions, when executed by a computer, further cause the computer to execute operations, comprising:
execute the mobile app;
monitor a network traffic including dataflow in response to the execution of the mobile app; and
determine the one or more uniform resource locators and one or more internet protocol addresses corresponding to the monitored dataflow of the mobile app.

11. The non-transitory computer readable storage medium of claim 8, where the instructions, when executed by a computer, further cause the computer to execute operations, comprising:
establish a connection with one or more external repositories storing information related to one or more geographical locations; and
based on a determined one or more uniform resource locators and one or more internet protocol addresses, determine one or more physical locations of a data transfer.

12. The non-transitory computer readable storage medium of claim 8, where the instructions, when executed by a computer, further cause the computer to execute operations, comprising:
instantiate a sandbox environment including a containerized system comprising a mobile emulator to emulate a runtime behavior of an end user's device including an execution of the mobile app.

13. The non-transitory computer readable storage medium of claim 8, wherein the dynamic analysis further comprises:
analyze one or more programming features associated with the mobile app, wherein the one or more programming features is selected from a group consisting of one or more types of code, a data obfuscation, a reflection, and a dynamic code loading.

14. The non-transitory computer readable storage medium of claim 8, wherein determining whether the mobile app violates or complies with one or more data protection standards is based on a plurality of visualizations including results of the static analysis and results of the dynamic analysis.

15. A computer-implemented method to analyze mobile apps for determining compliance or violation of data protection standards, comprising:
executing a static analysis to analyze program code of a mobile app to determine a source application programming interface representing a point of the program code at which personal data is retrieved and a sink application programming interface associated with the source application programming interface and representing an external server to which the personal data is transferred, and to determine whether the mobile app is enabled to instantiate objects of a class, invoke functions, invoke methods, and access fields, where the name of the class, the names of the functions, the names of the methods, and the names of the fields are represented by strings;
in response to a determination, during the static analysis, that the mobile app is enabled to instantiate objects of a class, invoke functions, invoke methods, and access fields, where the name of the class, the names of the functions, the names of the methods, and the names of the fields are represented by strings, executing a dynamic analysis, based on a runtime behavior of the mobile app, to identify transfer of personal data to a remote server during execution of the mobile app;
executing a location analysis to determine physical locations of the external server and the remote server; and
based on the physical locations of the external server and the remote server, determining whether the mobile app complies with or violates one or more data protection standards.

16. The computer implemented of claim 15, wherein the static analysis of the mobile app, comprises:
decompiling the mobile app;
executing a backward program slicing of the decompiled mobile app to determine dataflow; and
traversing the decompiled mobile app to extract one or more uniform resource locators or one or more internet protocol addresses.

17. The computer implemented of claim 15, wherein the dynamic analysis of the mobile app, comprises:
executing the mobile app;
monitoring a network traffic including a dataflow in response to the execution of the mobile app; and
in response to the execution of the mobile app, determining one or more uniform resource locators or one or more internet protocol addresses corresponding to the monitored dataflow.

18. The computer implemented of claim 15, wherein the location analysis, comprises:
establishing a connection with one or more external repositories storing information related to one or more geographical locations; and based on a determined one or more uniform resource locators and one or more internet protocol addresses in response to the static analysis and the dynamic analysis, determining one or more physical locations of a data transfer.

19. The computer implemented method of claim 15, wherein determining whether the mobile app violates or complies with one or more data protection standards is based on a plurality of visualizations including results of the static analysis and results of the dynamic analysis for the mobile app.

20. The computer implemented method of claim 15, wherein the dynamic analysis further comprises: analyzing one or more programming features associated with the mobile app, wherein the one or more programming features are selected from a group consisting of one or more types of code, a data obfuscation, a reflection, and a dynamic code loading.

* * * * *